June 3, 1924.

F. A. H. LONGWORTH

EGG POACHER

Filed April 7, 1923

1,496,717

INVENTOR.
F. A. H. Longworth.
BY J. Edward Maybee.
ATTY.

Patented June 3, 1924.

1,496,717

UNITED STATES PATENT OFFICE.

FREDERICK A. H. LONGWORTH, OF TORONTO, ONTARIO, CANADA.

EGG POACHER.

Application filed April 7, 1923. Serial No. 630,454.

*To all whom it may concern:*

Be it known that I, FREDERICK A. H. LONGWORTH, of the city of Toronto, in the county of York, Province of Ontario, Canada, a subject of the King of Great Britain, have invented certain new and useful Improvements in Egg Poachers, of which the following is a specification.

This invention relates to egg poachers and more particularly to the type in which rings are provided to limit the lateral spread of the eggs while cooking and my object is to provide an egg poacher that is simple in design, cheap to manufacture, and by means of which the eggs may be removed from the water without danger of breaking the yolks.

I attain my objects by means of the constructions hereinafter described and illustrated in the accompanying drawings in which—

Fig. 1 is a plan view of the rings;
Fig. 2 a similar view of the egg seats;
Fig. 3 a section on the line 3—3 in Fig. 1;
Fig. 4 a section on the line 4—4 in Fig. 2;
Fig. 5 a sectional view of a container showing the poacher therein; and
Fig. 6 a sectional view showing two egg poachers, one nested in the other.

In the drawings like numerals of reference indicate corresponding parts in the different figures.

A plurality of connected rings 1 are adapted to receive the connected egg seats 2 which are provided with the perforations 3. A handle 4 common to all the seats is provided for lowering the seats into and lifting them out of the rings.

The rings 1 are integrally formed by bending a strip of metal into a plurality of segmental rings as shown in Fig. 1 and then joining the ends of the strip in any suitable manner. At the upper and lower edges of the walls of the segmental rings are formed the beads 5 and 6 respectively, the former being directed outwardly and the latter directed inwardly for a purpose which will hereinafter appear.

The seats 2 are integrally formed from a sheet metal stamping having a central portion 7. To close the gap in each segmental ring 1, each seat is formed with a wall 8 extending part way round the periphery thereof. These walls join the seats with the central portion 7, each wall being gradually decreased in height from each side of this portion. The handle 4 is secured in any suitable manner to the central portion 7.

The device is used by placing it in a hot water container 9, then breaking the eggs and dropping their contents into the water in alinement with the seats 2 so that the latter will receive the eggs as they sink, each seat being adapted to carry the contents of one egg. The rings and the walls 8 of the seats limit the lateral spread of the eggs while cooking. After the eggs are cooked the seats 2 are lifted, by means of the handle 4, out of the rings and the eggs are slid from the seats by tipping the latter so that the open end of each seat is successively lowered. The walls 8 of the other seats, which are thus raised, prevent the eggs therein from sliding from the rear sides of these seats.

It is desirable to support the seats 2, when lowered into the rings, so that the former do not contact with the container and for this purpose the seats are adapted to engage and rest on the inwardly directed beads 6. This arrangement also eliminates the necessity of forming a tight fit for the seats and rings to prevent the eggs overflowing between them.

The walls of the rings 1 are tapered downwardly and inwardly so that the poaching devices may be nested, thus taking up the least amount of space for shipping purposes. Referring to Fig. 6 it will be noted that the handle 4 is formed as an eye adapted to lie under the centre portion 7 of the adjacent poaching device.

What I claim as my invention is:—

1. An egg poacher comprising a plurality of rings connected together; and a plurality of egg seats adapted to be received within the rings and integrally formed from a sheet metal stamping.

2. An egg poacher comprising a plurality of segmental rings having their centres substantially equidistant and on the same imaginary circle, a plurality of adjacent egg seats adapted to be received within the rings, each seat being provided with a wall portion extending sufficiently around the periphery thereof to close the gap in the ring in which it is seated.

3. An egg poacher comprising a plurality of adjacent and connected segmental rings; and a plurality of adjacent egg seats adapted to be received within the said segmental rings each seat being provided with a wall portion extending sufficiently around the periphery thereof to close the gap in the ring in which it is seated.

4. An egg poacher comprising a plurality of adjacent and segmental rings having their walls tapered downwardly and inwardly; a plurality of adjacent egg seats adapted to be received within the rings, each seat being provided with a wall portion extending sufficiently around the periphery thereof to close the gap in the ring in which it is seated; and a handle common to all the seats for lowering the seats into and lifting them out of the rings.

Signed at Toronto, Canada, this 26th day of March, 1923.

FREDERICK A. H. LONGWORTH.